Patented Jan. 17, 1939

2,144,522

UNITED STATES PATENT OFFICE 2,144,522

PREPARATION OF VEGETABLE GUM SOLUTIONS

Robert C. Braun, Clifton, N. J., assignor to Jacques Wolf & Co., Passaic, N. J., a corporation of New Jersey No Drawing. Application July 26, 1937, Serial No. 155,694

2 Claims. (Cl. 87—2)

This invention relates to the preparation of vegetable gum solutions,—for instance, those formed of gum shiraz, gum karaya, the locust bean gum or any of various other vegetable gums in raw state, or of combinations of different raw vegetable gums,—and more particularly to such preparation where, following solubilizing of the gum, concentration of the gum solution is effected so that the concentrated gum solution may be useful, for instance, as a thickener in the printing of textiles.

One object of the invention is to prepare solutions of vegetable gums so as to have them devoid or substantially completely deprived of color. This I accomplished by the use of activated carbon of commerce (now well known as a decolorizing agent, for instance, in the decolorizing of oils, fats and glycerine) but only by such use in the particular way hereinafter set forth. The coloring matter is absorbed by the activated carbon, which is ultimately removed by filtering.

But although I have accomplished this object I have found that when activated carbon alone is used the gum solution on being concentrated will nevertheless usually be cloudy instead of clear. This cloudy condition is due to the presence in the activated carbon of certain salts, notably sodium sulphate (usually present in amounts varying from one to eight percent) which goes into solution when the gum is solubilized, as with the aid of heat, but is precipitated out and becomes suspended when the gum solution is concentrated by evaporation, with incidental cooling, to the state ready for use.

Further, when activated carbon alone is used the concentrated gum solution will also be short-bodied instead of long-bodied. A "long-bodied" as distinguished from a "short-bodied" concentrated gum solution is one which, when drawn up from the solution by a glass stirring rod dipped therein, will flow back rather than drip or intermittently fall back into the solution until practically all of the liquid so drawn up has returned.

A further object of the invention, therefore, is to produce a concentrated vegetable gum solution which will be not only devoid or substantially deprived of color, but which will be cloudless; and in accomplishment of this object I have found that a long-bodied as distinguished from a short-bodied concentrated gum solution results.

Now in respect to my first-mentioned object, while others have attempted to remove the color by the use of activated carbon without success, I have discovered that it is indispensable to the removal of the color to have the activated carbon present in some way in the water-and-gum mixture before the solubilizing is initiated. The quantity of such activated carbon may be from 1 to 5 per cent of the total amount of gum and water present (by weight) where they are in the proportions 1 to 9 (by weight).

In respect to my second-named object I have found that if aluminum sulphate is made to be present with the activated carbon and hence with the sodium sulphate associated therewith there will not only be elimination of color but a lessening of the cloudiness in the concentrated gum solution, and that if not less than a certain quantity of such aluminum sulphate be present there will be a definitely complete lack of cloudiness. Further, that such gum solution will be distinctly long-bodied.

I account for the improvement as to clarity as follows: If sodium sulphate and aluminum sulphate are crystallized by concentration out of a solution in which both are present they combine to form aluminum-sodium sulphate, a double salt the solubility of which in the concentrated gum solution is about ten times as great as that of sodium sulphate (which, per se, is practically insoluble in such solution). As for the long-bodied condition of the ultimate gum solution, the complicated chemical composition of these vegetable gums and solutions thereof is not sufficiently known to afford a definite explanation; I however make this observation: that it is known that some alkalis, such as borax, will completely change their body, and apparently either aluminum sulphate, or the double salt subsequently formed, likewise acts.

The chemical formula for the said double salt is $AlNa(SO_4)_2 \cdot 12H_2O$, which may also be written $Al_2(SO_4)_3 \cdot Na_2SO_4 \cdot 24H_2O$. This shows that the two sulphates combine to form the double salt in the ratio of 2.4 parts of aluminum sulphate to 1 part of sodium sulphate.

Hence, having by analysis determined the amount of sodium sulphate associated with the activated carbon, I cause to be present in the water, gum and activated carbon mixture, before the concentration step, enough aluminum sulphate so that there will be at least 2.4 parts thereof to each part of sodium sulphate, by weight. According as the aluminum sulphate is less than the indicated quantity so the cloudiness will be greater and the ultimate solution shorter-bodied. A greater quantity, however, leaves the solution still cloudless and long-bodied.

It is not material when the aluminum sulphate is introduced except that it should be at some time before the concentration of the solution is effected. After the solubilizing the gum solution may be filtered and then concentrated in the usual way, by evaporation.

For the purpose of this specification the term "activated carbon" is used to mean the activated carbon of commerce, i. e., contaminated by presence of sodium sulphate.

Having thus fully described my invention what I claim is:

1. The herein-described method of preparing a concentrated solution from a raw vegetable gum which consists in forming a mixture of the gum and water, thereupon solubilizing the gum in the water of such mixture having already caused the herein-defined activated carbon to be present in the mixture, and, having already caused aluminum sulphate to be present with the water, gum and such carbon, thereupon separating the carbon from and concentrating the solution formed.

2. The herein-described method of preparing a concentrated solution from a raw vegetable gum which consists in forming a mixture of the gum and water, thereupon solubilizing the gum in the water of such mixture having already caused the herein-defined activated carbon to be present in the mixture, and, having already caused aluminum sulphate to be present with the water, gum and such carbon in the proportion, by weight, of not less than 2.4 parts of such aluminum sulphate to 1 part of the sodium sulphate associated with the carbon, thereupon separating the carbon from and concentrating the solution formed.

ROBERT C. BRAUN.